US011151811B2

(12) United States Patent
Tokita et al.

(10) Patent No.: US 11,151,811 B2
(45) Date of Patent: Oct. 19, 2021

(54) INFORMATION PROCESSING DEVICE, INFORMATION PROCESSING METHOD, AND NON-TRANSITORY RECORDING MEDIUM STORING PROGRAM

(71) Applicant: TOYOTA JIDOSHA KABUSHIKI KAISHA, Toyota (JP)

(72) Inventors: Hiroyuki Tokita, Toyota (JP); Hiroyuki Sawada, Toyota (JP); Shojiro Suga, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 248 days.

(21) Appl. No.: 16/385,002

(22) Filed: Apr. 16, 2019

(65) Prior Publication Data

US 2019/0340851 A1 Nov. 7, 2019

(30) Foreign Application Priority Data

May 7, 2018 (JP) .............................. JP2018-089492

(51) Int. Cl.
*G07C 5/08* (2006.01)
*G07C 5/00* (2006.01)
*B60W 50/08* (2020.01)
*B60W 40/08* (2012.01)

(52) U.S. Cl.
CPC ........... *G07C 5/0841* (2013.01); *B60W 40/08* (2013.01); *B60W 50/082* (2013.01); *G07C 5/008* (2013.01)

(58) Field of Classification Search
CPC ..... G07C 5/0841; G07C 5/008; B60W 40/08; B60W 50/082

USPC ........................................................... 701/1
See application file for complete search history.

(56) References Cited

U.S. PATENT DOCUMENTS

| 9,134,986 | B2 | 9/2015 | Ricci | |
|---|---|---|---|---|
| 9,855,918 | B1* | 1/2018 | Melaragni | B60R 25/01 |
| 2006/0192650 | A1* | 8/2006 | Shinada | B60R 25/24 340/5.2 |
| 2006/0217848 | A1* | 9/2006 | Oesterling | G08G 1/207 701/1 |
| 2007/0124043 | A1* | 5/2007 | Ayoub | G06F 21/10 701/36 |

(Continued)

FOREIGN PATENT DOCUMENTS

| CN | 104933467 A | * | 9/2015 |
|---|---|---|---|
| CN | 106341487 A | * | 1/2017 |

(Continued)

OTHER PUBLICATIONS

T. Yano et al., "Vehicle Identification Technique using Active Laser Radar System," 2003, Publisher: IEEE.*

(Continued)

*Primary Examiner* — Tuan C To
(74) *Attorney, Agent, or Firm* — Oliff PLC

(57) ABSTRACT

An information processing device includes: a communication unit configured to communicate with a vehicle used by a user; and a control unit configured to receive user information on the user via the communication unit, determine a usage mode of the vehicle according to a use purpose of the vehicle, the use purpose being estimated based on the user information, and send usage mode information on the usage mode to the vehicle via the communication unit.

11 Claims, 11 Drawing Sheets

(56) References Cited

U.S. PATENT DOCUMENTS

| | | | |
|---|---|---|---|
| 2007/0219672 A1* | 9/2007 | Fehr | B60W 40/08 701/1 |
| 2008/0195428 A1 | 8/2008 | O'Sullivan | |
| 2011/0246246 A1* | 10/2011 | Johnson | G06Q 50/14 705/5 |
| 2014/0310702 A1* | 10/2014 | Ricci | G06F 21/31 717/173 |
| 2014/0328248 A1* | 11/2014 | Greubel | H04W 8/005 370/328 |
| 2016/0143022 A1* | 5/2016 | Kim | H04W 12/068 455/415 |
| 2017/0103756 A1* | 4/2017 | Kobayashi | G10L 15/30 |
| 2017/0123423 A1 | 5/2017 | Sako et al. | |
| 2017/0330034 A1* | 11/2017 | Wang | G06K 9/00671 |
| 2018/0120123 A1* | 5/2018 | Seok | B60L 15/20 |
| 2018/0215392 A1* | 8/2018 | Kosaka | G05D 1/0061 |

FOREIGN PATENT DOCUMENTS

| | | | | |
|---|---|---|---|---|
| DE | 10038096 A1 | * | 2/2002 | G06F 8/61 |
| DE | 102016215312 A1 | | 2/2018 | |
| EP | 3163457 A1 | * | 5/2017 | G06F 3/04842 |
| JP | 3766408 B2 | * | 4/2006 | |
| JP | 2013-126788 A | | 6/2013 | |
| KR | 10-2014-0039097 A | | 4/2014 | |
| KR | 10-2015-0000350 A | | 1/2015 | |
| KR | 20150078786 A | * | 7/2015 | |
| KR | 10-1724501 B1 | | 4/2017 | |
| RU | 2207262 C1 | * | 6/2003 | |
| RU | 2617250 C2 | | 4/2017 | |

OTHER PUBLICATIONS

Inyoung et al., "Augmented Reality Service using Real-Time Device Recognition," 2011, Publisher: IEEE.*

* cited by examiner

FIG. 4

| MEMBER ID | PERSONAL INFORMATION | | | | APPLICATION IDENTIFICATION (ID) | |
|---|---|---|---|---|---|---|
| | SEX | AGE | ADDRESS | WORKPLACE | | |
| 111111 | MAN | **IES | ○○ CITY, ○○ PREFECTURE | △△ Co., Ltd | ... | ... |
| ... | ... | ... | ... | ... | ... | ... |
| ... | ... | ... | ... | ... | ... | ... |

FIG. 5

| DAY-OF-WEEK CLASSIFICATION | USE TIME | VEHICLE MOVEMENT | MEMBER ID | PERSONAL INFORMATION | DESTINATION | ESTIMATION RESULT |
| --- | --- | --- | --- | --- | --- | --- |
| | | | ID | WORKPLACE | | |
| WEEKDAY | 0:00~5:59 | NO | 111111 | ○○Co., Ltd | NONE | SLEEP |
| | 6:00~9:59 | YES | 111111 | ○○Co., Ltd | ○○Co., Ltd | GO TO WORK |
| | 10:00~11:59 | YES | 111111 | ○○Co., Ltd | ××Co., Ltd | TAKE BUSINESS TRIP |
| | 12:00~12:59 | NO | 111111 | ○○Co., Ltd | NONE | HAVE LUNCH OR NAP |
| | 13:00~16:59 | NO | 111111 | ○○Co., Ltd | NONE | USE AS OFFICE |
| | 17:00~23:59 | YES | 111111 | ○○Co., Ltd | HOME | RETURN HOME |

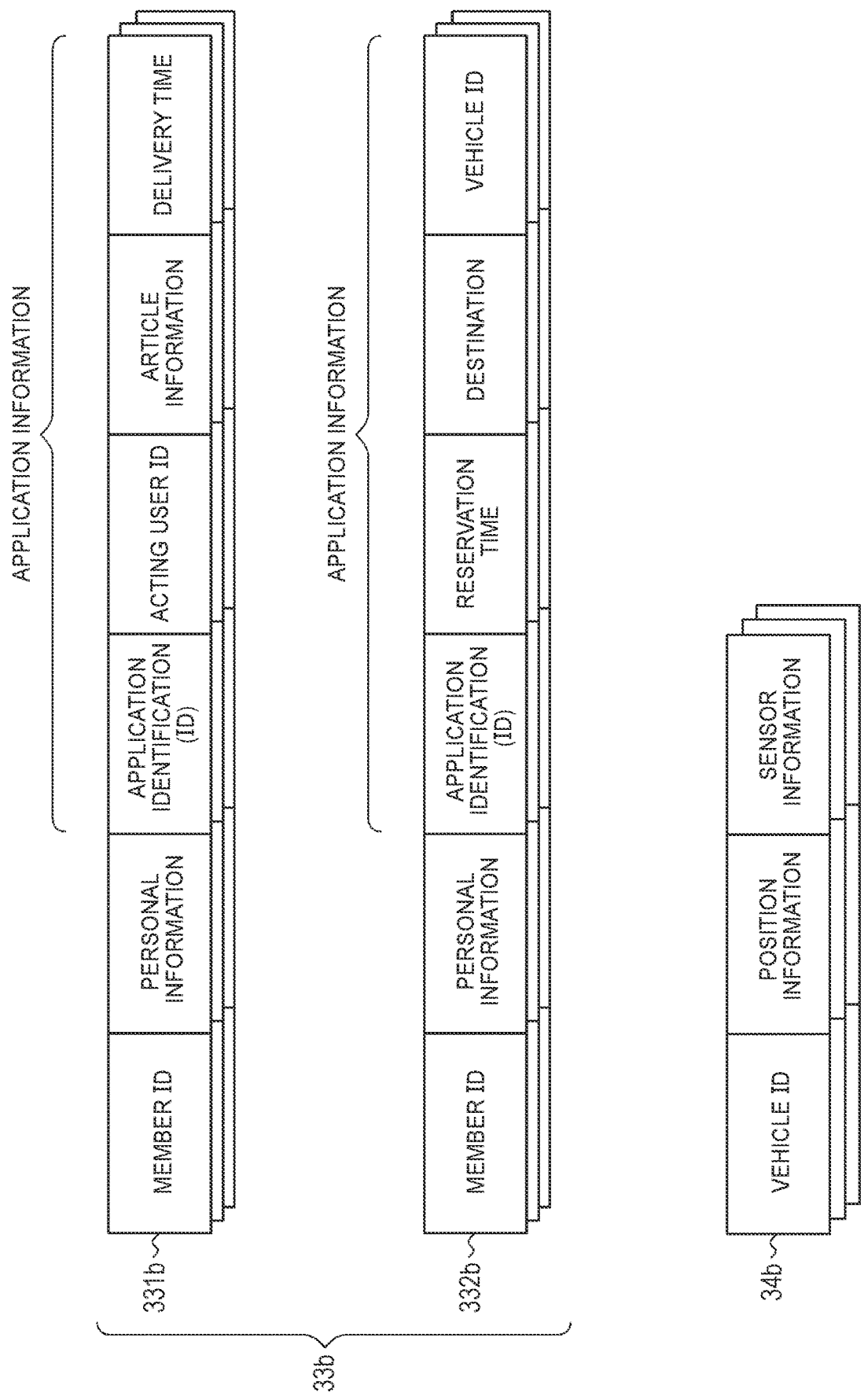

FIG. 7

| DAY-OF-WEEK CLASSIFICATION | USE TIME | APPLICATION TYPE | DRIVER PRESENCE/ABSENCE | MEMBER ID ID (CLIENT USER) | MEMBER ID ID (ACTING USER) | ESTIMATION RESULT |
|---|---|---|---|---|---|---|
| WEEKDAY | 0:00~5:59 | NON-ARTICLE SHARING APPLICATION | PRESENT | 111111 | NONE | SHARE NON-ARTICLE |
| | 6:00~9:59 | NON-ARTICLE SHARING APPLICATION | PRESENT | 111111 | NONE | SHARE NON-ARTICLE |
| | 10:00~11:59 | CLOTHING APPLICATION | PRESENT | 111111 | 222222 | SEND CLOTHING/BAG |
| | 12:00~12:59 | BAG APPLICATION | PRESENT | 111111 | 222222 | SEND CLOTHING/BAG |
| | 13:00~16:59 | CLOTHING APPLICATION | ABSENT | 111111 | 222222 | SEND CLOTHING/BAG + DRIVE AUTONOMOUSLY |
| | 17:00~23:59 | NON-ARTICLE SHARING APPLICATION | ABSENT | 111111 | NONE | SHARE NON-ARTICLE + DRIVE AUTONOMOUSLY |

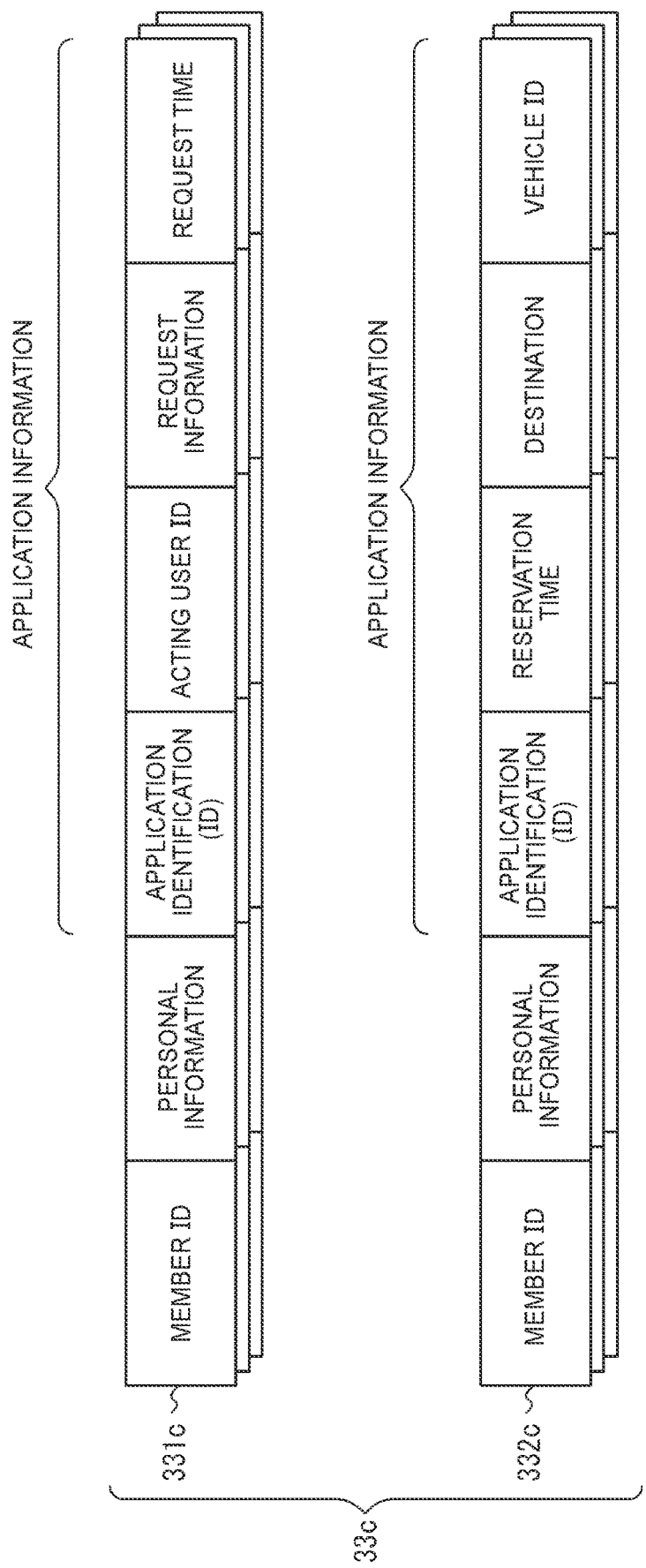

FIG. 9

| DAY-OF-WEEK CLASSIFICATION | USE TIME | APPLICATION TYPE | | | | | MEMBER ID | | ESTIMATION RESULT |
|---|---|---|---|---|---|---|---|---|---|
| | | CHILD-CARE | SKILL | PET-CARE | CROSS CULTURAL EXCHANGE | DINNER PARTY | ID (CLIENT USER) | ID (ACTING USER) | |
| WEEKDAY | 0:00~5:59 | | | | | | 111111 | 222222 | SHARE NON-RESOURCE |
| | 6:00~9:59 | | | | | | 111111 | 222222 | SHARE NON-RESOURCE |
| | 10:00~11:59 | | ○ | | | | 111111 | 222222 | DO HOUSEKEEPING |
| | 12:00~12:59 | | | | | | 111111 | 222222 | SHARE NON-RESOURCE |
| | 13:00~16:59 | | | | | | 111111 | 222222 | SHARE NON-RESOURCE |
| | 17:00~23:59 | | | | | ○ | 111111 | 222222 | HAVE DINNER WITH FRIENDS |
| HOLIDAY | 0:00~5:59 | | | | | | 111111 | 222222 | SHARE NON-RESOURCE |
| | 6:00~9:59 | | | | | | 111111 | 222222 | SHARE NON-RESOURCE |
| | 10:00~11:59 | | | ○ | | | 111111 | 222222 | TAKE CARE OF PETS |
| | 12:00~12:59 | ○ | | | | | 111111 | 222222 | TAKE CARE OF CHILD |
| | 13:00~16:59 | | | | | | 111111 | 222222 | SHARE NON-RESOURCE |
| | 17:00~23:59 | | | | ○ | | 111111 | 222222 | PARTICIPATE IN CROSS CULTURAL EXCHANGE SERVICES |

FIG. 10

| ESTIMATION RESULT | USAGE MODE |
|---|---|
| SLEEP | EXTREMELY COMFORTABLE MODE |
| GO TO WORK | ENERGY SAVING MODE |
| TAKE BUSINESS TRIP | ENERGY SAVING MODE |
| HAVE LUNCH OR NAP | COMFORTABLE MODE |
| USE AS OFFICE | ENERGY SAVING MODE |
| RETURN HOME | COMFORTABLE MODE |

FIG. 11

| ESTIMATION RESULT | USAGE MODE |
|---|---|
| SEND CLOTHING/BAG | STORAGE MODE |
| SEND CLOTHING/BAG + DRIVE AUTONOMOUSLY | STORAGE MODE |
| SEND RAW THING | EXTREMELY COMFORTABLE MODE |
| SEND DOCUMENT | STORAGE MODE |
| SEND FURNITURE | EXTREME ENERGY SAVING MODE |

FIG. 12

| ESTIMATION RESULT | USAGE MODE |
|---|---|
| DO HOUSEKEEPING | HOUSEKEEPING MODE |
| HAVE DINNER WITH FRIENDS | DINNER-WITH-FRIENDS MODE |
| TAKE CARE OF PETS | PET-CARE TAKING MODE |
| TAKE CARE OF CHILD | CHILDCARE TAKING MODE |
| PARTICIPATE IN CROSS CULTURAL EXCHANGE SERVICES | CROSS-CULTURAL EXCHANGE MODE |

INFORMATION PROCESSING DEVICE, INFORMATION PROCESSING METHOD, AND NON-TRANSITORY RECORDING MEDIUM STORING PROGRAM

INCORPORATION BY REFERENCE

The disclosure of Japanese Patent Application No. 2018-089492 filed on May 7, 2018 including the specification, drawings and abstract is incorporated herein by reference in its entirety.

BACKGROUND

1. Technical Field

The present disclosure relates to an information processing device, an information processing method, and a non-transitory recording medium storing a program.

2. Description of Related Art

There is a technique in which a vehicle corresponds to a plurality of traveling modes and traveling is controlled based on one of the plurality of traveling modes. For example, Japanese Patent Application Publication No. 2013-126788 (JP 2013-126788 A) discloses a vehicle traveling mode switching device capable of switching the traveling mode according to the traveling environment. The technique disclosed in Japanese Patent Application Publication No. 2013-126788 (JP 2013-126788 A) provides the following four types of traveling modes: EV mode, ECO mode, normal mode, and power mode corresponding, respectively, to a residential area, an urban area, a mountain road, and an expressway. The vehicle traveling mode switching device controls a vehicle by switching the traveling mode among these four types.

SUMMARY

Recently, the car sharing service, in which people rent cars for short periods of time for their own use, becomes popular. This service can be used for various purposes such as movement of people, distribution of articles, and sale of articles. Therefore, controlling a vehicle by switching the vehicle usage mode (hereinafter referred to as the usage mode) according to the use purpose of a car sharing service user can lead to an improvement in convenience.

The present embodiments improve the convenience of the technique that controls a vehicle by switching among a plurality of usage modes.

A first aspect of the present disclosure provides an information processing device. The information processing device includes: a communication unit configured to communicate with a vehicle used by a user; and a control unit configured to receive user information on the user via the communication unit, determine a usage mode of the vehicle according to a use purpose of the vehicle, the use purpose being estimated based on the user information, and send usage mode information on the usage mode to the vehicle via the communication unit.

In the first aspect, the user information may include application information on an application operated on a terminal device of the user, and the control unit may be configured to estimate the use purpose based on the application information.

In the first aspect, the control unit may be configured to receive vehicle information on the vehicle via the communication unit, and estimate the use purpose based on the user information and the vehicle information.

In the first aspect, the vehicle information may include at least one of position information on the vehicle, video information on an interior of the vehicle, sensor information on the vehicle, and operation state information of the vehicle.

In the first aspect, the information processing device may be configured to perform vehicle control of the vehicle based on the usage mode, and the vehicle control includes at least one of air conditioning control in the vehicle, information provision control in the vehicle, and traveling control in the vehicle.

In the first aspect, the control unit may be configured to send information on the usage mode to the vehicle via the communication unit when the control unit determines, based on position information on a terminal device of the user and the position information on the vehicle, that there is the terminal device within a predetermined range from the vehicle.

In the first aspect, the application information may include type information on a type of the application determined based on an application identification of the application.

In the first aspect, the type information may include information determining a type of a resource sharing application, the resource sharing application being an application except a car sharing application.

A second aspect of the present disclosure provides an information processing method. The information processing method includes: receiving user information on a user who uses a vehicle, determining a usage mode of the vehicle according to a use purpose of the vehicle, the use purpose being estimated based on the user information, and sending usage mode information on the usage mode to the vehicle.

A third aspect of the present disclosure provides a non-transitory recording medium storing a program causing an information processing device to execute receiving user information on a user who uses a vehicle, determining a usage mode of the vehicle according to a use purpose of the vehicle based on the user information, and sending usage mode information on the usage mode to the vehicle.

According to the information processing device, information processing method, and non-transitory recording medium storing a program according to one embodiment, it is possible to improve the convenience of the technique that controls a vehicle by switching among a plurality of usage modes.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram showing a specific example of the user information;

FIG. 5 is a diagram showing an estimation result database in the first embodiment;

FIG. 6 is a conceptual diagram showing an example of user information and vehicle information used in the estimation processing in a second embodiment;

FIG. 7 is a diagram showing an estimation result database in the second embodiment;

FIG. 8 is a conceptual diagram showing an example of user information used in the estimation processing in a third embodiment;

FIG. 9 is a diagram showing an estimation result database in the third embodiment;

FIG. 10 is a diagram showing an example of relationship between estimation results and usage modes;

FIG. 11 is a diagram showing another example of relationship between estimation results and usage modes; and FIG. 12 is a diagram showing a still another example of relationship between estimation results and usage modes.

DETAILED DESCRIPTION OF EMBODIMENTS

Figure 1:
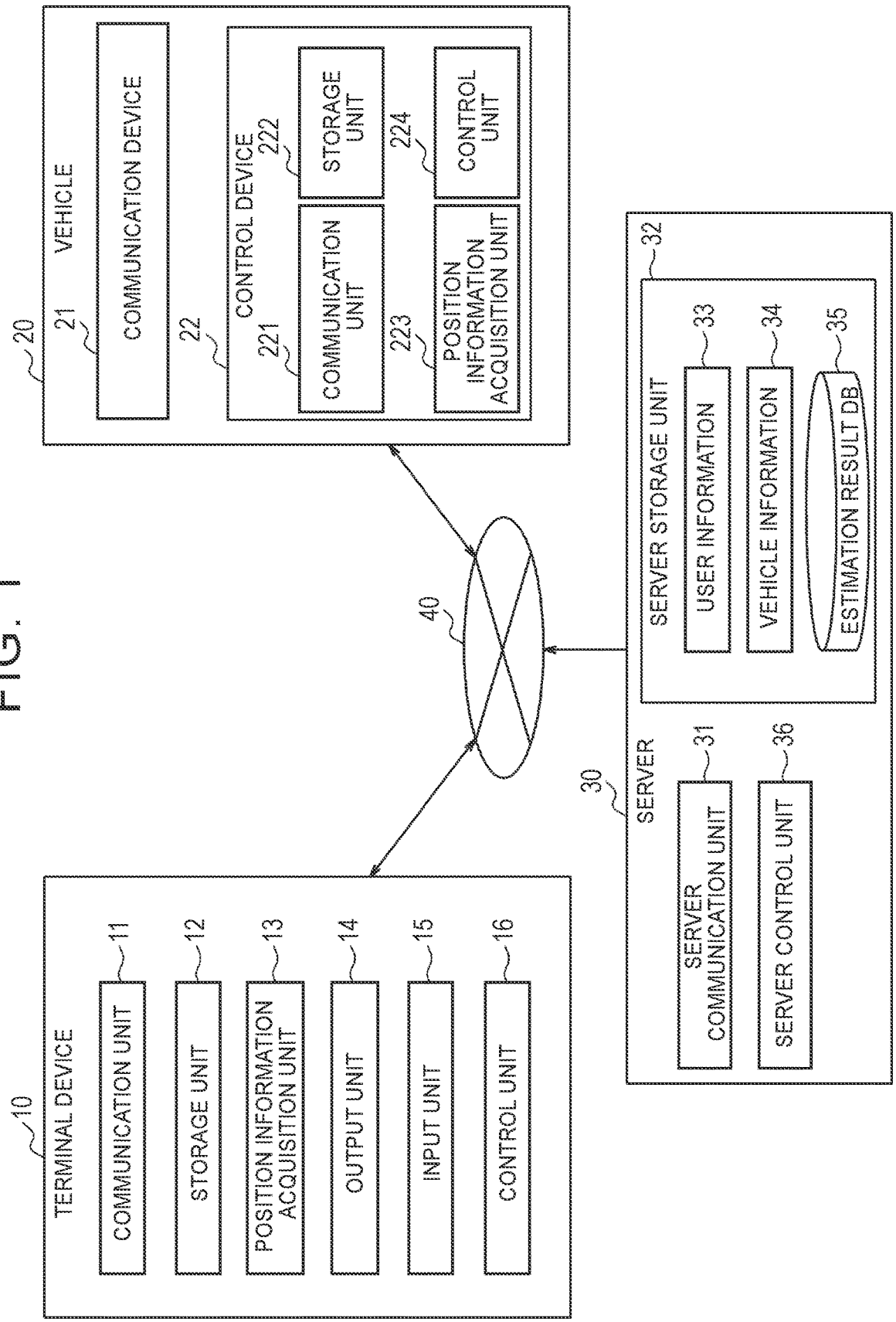
FIG. 1 is a diagram showing a schematic configuration of an information processing system according to one embodiment of the present disclosure.

Embodiments of the present disclosure will be described below in detail.

(Configuration of Information Processing System)

The outline of an information processing system 1 according to one embodiment of the present disclosure will be described below with reference to FIG. 1. The information processing system 1 includes a terminal device 10, a vehicle 20, and a server 30. Although one terminal device 10 and one vehicle 20 are shown for the sake of description in FIG. 1, any number of terminal devices 10 and vehicles 20 may be provided in the information processing system 1. The terminal device 10, vehicle 20, and server 30 are connected to a network 40. The network 40 is typically a mobile communication network or the Internet but is not limited thereto; any communication network may also be used.

The terminal device 10 is typically a general-purpose mobile terminal such as a smartphone or a tablet terminal but is not limited thereto; for example, the terminal device 10 may also be any mobile terminal such as a device dedicated to the information processing system 1. The terminal device 10 is carried by a user. The vehicle 20 is, for example, an automobile but not limited thereto; the vehicle 20 may also be any vehicle on which a person can board. The vehicle 20 is a vehicle provided by a service provider such as a car sharing company. The vehicle 20 is a vehicle driven by a user but is not limited thereto; for example, the vehicle 20 may also be a vehicle that is driven autonomously. The autonomous driving levels assumed in this system include levels 1 to 5 defined by Society of Automotive Engineers (SAE) but is not limited thereto; any autonomous driving levels may be defined freely. The vehicle 20 can be used for more and more purposes as the autonomous driving technology or the emerging connected-car technology further advances and as the sharing economy further expands. The server 30 includes one or more server devices that can communicate with each other. For the sake of description, it is assumed in the description of this embodiment that the server 30 is one server device. In this embodiment, the server 30 is an example of the "information processing device".

In the information processing system 1 according to this embodiment, the terminal device 10, vehicle 20, and server 30 cooperate with each other to control the vehicle 20 so that the use purpose of the user is satisfied. Roughly speaking, the information processing system 1 estimates the use purpose of the user, who uses the vehicle 20, based on the information on the user (user information 33). The server 30 receives the user information 33 from the terminal device 10 or the like. As will be described later, the user information 33 includes the information on an application program (hereinafter also referred to as an application) operated on the terminal device 10 and, based on this information on the application, the use purpose of the user can be estimated. The server 30 estimates the use purpose of the vehicle 20 based on the received user information 33 and determines the usage mode of the vehicle 20 according to the estimated use purpose. After determining the usage mode, the server 30 notifies the vehicle 20 about the determined usage mode to cause the vehicle 20 to control the vehicle interior environment, fuel economy, comfortableness, convenience, etc. of the vehicle 20 based on usage mode.

In this information processing system 1, the server 30 receives the user information 33 from the terminal device 10 and estimates the use purpose based on the user information 33 as described above. In addition, the server 30 determines the usage mode of the vehicle 20 according to the estimated use purpose for controlling the vehicle 20 based on the determined usage mode. In this way, the information processing system 1 controls the vehicle 20 so that the use purpose of the user is satisfied and the usage mode is switched from one of the plurality of usage modes to another, thus improving the convenience of the vehicle control technique.

Next, the components of the information processing system 1 will be described in detail below.

(Configuration of Terminal Device)

As shown in FIG. 1, the terminal device 10 includes a communication unit 11, a storage unit 12, a position information acquisition unit 13, an output unit 14, an input unit 15, and a control unit 16.

The communication unit 11 includes a communication module for connection to the network 40. For example, the communication unit 11 may include a communication module conforming to mobile communication standards such as the 4th generation (4G) standard or the 5th generation (5G) standard. In this embodiment, the terminal device 10 is connected to the network 40 via the communication unit 11.

The storage unit 12 includes one or more memories. In this embodiment, the "memory" is, for example, a semiconductor memory, a magnetic memory, or an optical memory but is not limited thereto. Each memory included in the storage unit 12 may function as a main storage device, an auxiliary storage device, or a cache memory. The storage unit 12 stores any information used for the operation of the terminal device 10. For example, the storage unit 12 may store system programs, application programs, identification information on the terminal device 10, and the identification information on the user. The application programs include a car sharing application. The car sharing application is used to rent the vehicle 20 from a car sharing service provider. When renting the vehicle 20, the user reserves the use of the vehicle 20 using the car sharing application and uses the vehicle 20 within the reserved reservation time. The application programs also include an application dedicated to this system (hereinafter referred to as a dedicated application). In this system, the dedicated application is used by the server 30 to collect the user information 33. The information stored in the storage unit 12 may be information updatable with the information acquired from the network 40 via the communication unit 11.

The position information acquisition unit 13 includes one or more receivers corresponding to any satellite positioning system. For example, the position information acquisition unit 13 may include a Global Positioning System (GPS) receiver. The position information acquisition unit 13 acquires the position information on the terminal device 10.

The output unit 14 includes one or more output interfaces for outputting information to the user. For example, the output interfaces included in the output unit 14 are a panel display that outputs information as video or a speaker that outputs information by voice, but is not limited thereto.

The input unit 15 includes one or more input interfaces for detecting a user input. For example, the input interfaces included in the input unit 15 are physical keys, capacitance keys, a touch screen provided integrally with the panel display of the output unit 14, or a microphone that accepts a voice input, but is not limited thereto.

The control unit 16 includes one or more processors. In this embodiment, a "processor" is a general-purpose processor or a dedicated processor dedicated to specific processing, but is not limited thereto. The control unit 16 controls the overall operation of the terminal device 10.

For example, the control unit 16 stores the position information on the terminal device 10, acquired by the position information acquisition unit 13, in the storage unit 12. The control unit 16 notifies, via the communication unit 11, the server 30 about the identification information on the user and the position information on the terminal device 10 stored in the storage unit 12. This notification may be sent to the server 30 anytime. For example, the control unit 16 sends the notification to the server 30 at a predetermined time interval or each time the terminal device 10 enters a particular state. After the position information on the terminal device 10 is sent to the server 30, the control unit 16 may erase it from the storage unit 12.

The control unit 16 also sends the user information 33 to the server 30 via the communication unit 11. The user information may include the user's personal information and the member ID. The user information may also include the application information on an application operated by the terminal device 10. The control unit 16 collects and manages the user information 33 using the dedicated application. For example, the dedicated application manages the member ID, which is used in the information processing system 1, and the personal information. The member ID is the identification information for uniquely identifying the user in this system. The personal information is the information on the sex, age, address, workplace, etc., of the user. To use this system, the user installs the dedicated application in the terminal device 10 in advance. For example, when the dedicated application is started for the first time, the authentication processing required for this system may be performed and, on the authentication processing screen, the server 30 may collect the member ID and the personal information entered via the input unit 15.

The dedicated application cooperates with another non-dedicated application, which has been installed in the terminal device 10, to cause the server 30 to acquire the application information on this non-dedicated application. This non-dedicated application is, for example, a car sharing application, an article sharing application, and a resource sharing application. The application information on this non-dedicated application includes the application identification (ID). The application identification (ID) is the information for uniquely identifying the application. The application information includes the information entered, edited, selected, or determined during execution of the application via the input unit 15.

After installed, the dedicated application displays the push notification on the terminal device 10 via the output unit 14 to ask the user whether the user agrees on cooperation with another application. After receiving the agreement on cooperation from the user, the server 30 collects the application information. The server 30 may collect the application information in various ways. For example, the server 30 may collect the application information from the terminal device 10. In this case, when another application is activated in the terminal device 10, the control unit 16 notifies the dedicated application about the application information on the application that has been activated. The control unit 16 sends the user information 33, which includes the application information notified by the dedicated application, to the server 30. The server 30 may also collect the application information, not from the terminal device 10, but from an external server that manages each application. For example, when an application is activated in the terminal device 10 and the application information on the activated application is sent to an external server, the server 30 may acquire the application information from the external server based on the user agreement described above.

(Configuration of Vehicle)

As shown in FIG. 1, the vehicle 20 includes a communication device 21 and a control device 22. The communication device 21 and the control device 22 are connected to the vehicle 20 via an in-vehicle network, such as a Controller Area Network (CAN) or the dedicated line, so that the communication device 21 and the control device 22 can communicate with the vehicle 20.

The communication device 21 may be an in-vehicle communication device such as a Data Communication Module (DCM). The communication device 21 may include communication modules conforming to mobile communication standards, such as the 4G standard or 5G generation standard, for connection to the network 40.

The control device 22 is a device that controls the vehicle 20. The vehicle control includes air conditioning control, information provision control, and traveling control. The control device 22 controls the vehicle based on the usage mode acquired from the server 30 via the communication device 21. As shown in FIG. 1, the control device 22 includes a communication unit 221, a storage unit 222, a position information acquisition unit 223, and a control unit 224.

The communication unit 221 includes a communication module that communicates with the communication device 21. The communication unit 221 may include a communication module conforming to a predetermined communication standard. For example, The CAN protocol may be used as the communication protocol when the communication unit 221 communicates with the communication device 21 and each ECU.

The storage unit 222 includes one or more memories. Each of the memories included in the storage unit 222 may function as a main storage device, an auxiliary storage device, or a cache memory. The storage unit 222 stores any information used for the operation of the control device 22. For example, the storage unit 222 may store system programs, application programs, databases, and the like. The information stored in the storage unit 222 may be updatable, for example, with the information acquired from the network 40 via the communication device 21.

The position information acquisition unit 223 includes one or more receivers corresponding to any satellite positioning system. For example, the position information acquisition unit 223 may include a GPS receiver. The position information acquisition unit 223 acquires the position information on the vehicle 20.

The control unit 224 includes one or more processors. The control unit 224 controls the overall operation of the control device 22.

The control unit 224 acquires the information on the vehicle 20 (vehicle information 34) from the position information acquisition unit 223 and each Electronic Control Unit (ECU) via the communication unit 221. The vehicle information includes the identification information on the vehicle 20 (hereinafter referred to as a vehicle ID). The vehicle ID is the information for uniquely identifying the vehicle 20. The identification information on the communication device 21 or the control device 22, provided in the vehicle 20, may also be used as the vehicle ID. The identification information (in-vehicle device ID) on a device, such as a navigation device mounted on the vehicle 20, may also be used as the vehicle ID.

The vehicle information 34 includes, for example, the position information on the vehicle 20. The vehicle information may also include the information obtained by the sensors mounted on the vehicle 20 (sensor information). The sensors may include a LIDAR, an acceleration sensor, an angular velocity sensor, a magnetic sensor, an atmospheric pressure sensor, an illuminance sensor, an outside air temperature sensor, an interior temperature sensor, an image sensor (camera), or the like. The control unit 224 acquires the information, detected by each sensor, as the sensor information. The control unit 224 sends the vehicle information 34 to the communication device 21 via the communication unit 221 and, through the communication device 21, sends the vehicle information 34 to the server 30. Note here that the notification (vehicle information 34) may be sent to the server 30 anytime. For example, the control unit 224 sends the vehicle information 34 to the server 30 each time the vehicle 20 enters a particular state (e.g., when the vehicle is parked or an occupant gets out of the vehicle). The vehicle information 34 may be used for estimating the use purpose of the vehicle 20.

Furthermore, the control unit 224 receives the usage mode notification from the communication device 21 via the communication unit 221. The usage mode notification is received from the server 30. The control unit 224 controls the vehicle based on the notified usage mode. To carry out this vehicle control, the control device 22 and the ECU of the vehicle 20 cooperate with each other to control the power source, the air conditioner, the information output equipment, the in-vehicle equipment, and the like.

(Configuration of Server)

As shown in FIG. 1, the server 30 includes a server communication unit 31, a server storage unit 32, and a server control unit 36.

The server communication unit 31 includes a communication module for connection to the network 40. For example, the server communication unit 31 may include a communication module conforming to a predetermined wired standard or wireless standard. In this embodiment, the server 30 is connected to the network 40 via the server communication unit 31.

The server storage unit 32 includes one or more memories. Each memory included in the server storage unit 32 may function as a main storage device, an auxiliary storage device, or a cache memory. The server storage unit 32 stores any information used for the operation of the server 30. For example, the server storage unit 32 stores the user information 33 collected from the terminal device 10 and the vehicle information 34 collected from the vehicle 20. The server storage unit 32 may also store an estimation result database 35 that will be described later. The server storage unit 32 may also store system programs, application programs, management databases, and the like. The information stored in the server storage unit 32 may be updatable with the information acquired from the network 40 via the server communication unit 31.

The server control unit 36 includes one or more processors. The server control unit 36 controls the overall operation of the server 30.

For example, the server control unit 36 receives the user information 33 from the terminal device 10 via the server communication unit 31. The server control unit 36 stores the user information 33 in the server storage unit 32. In addition, the server control unit 36 receives the vehicle information 34 from the vehicle 20 via the server communication unit 31. The server control unit 36 stores the vehicle information 34 in the server storage unit 32.

Using the user information 33 and the vehicle information 34, the server control unit 36 estimates the use purpose of the user who uses the vehicle 20. After that, according to the estimated use purpose, the server control unit 36 determines the usage mode of the vehicle 20. The estimation processing of the use purpose and the determination processing of the usage mode will be described later.

The server control unit 36 notifies the vehicle 20 about the determined usage mode via the server communication unit 31. That is, the server control unit 36 sends the information on the determined usage mode to the vehicle 20 via the server communication unit 31. The vehicle 20 is controlled based on the information on the usage mode. In other words, the server control unit 36 carries out the vehicle control of the vehicle 20 by notifying the vehicle 20 about the usage mode.

(Operation of Information Processing System)

Figure 2:
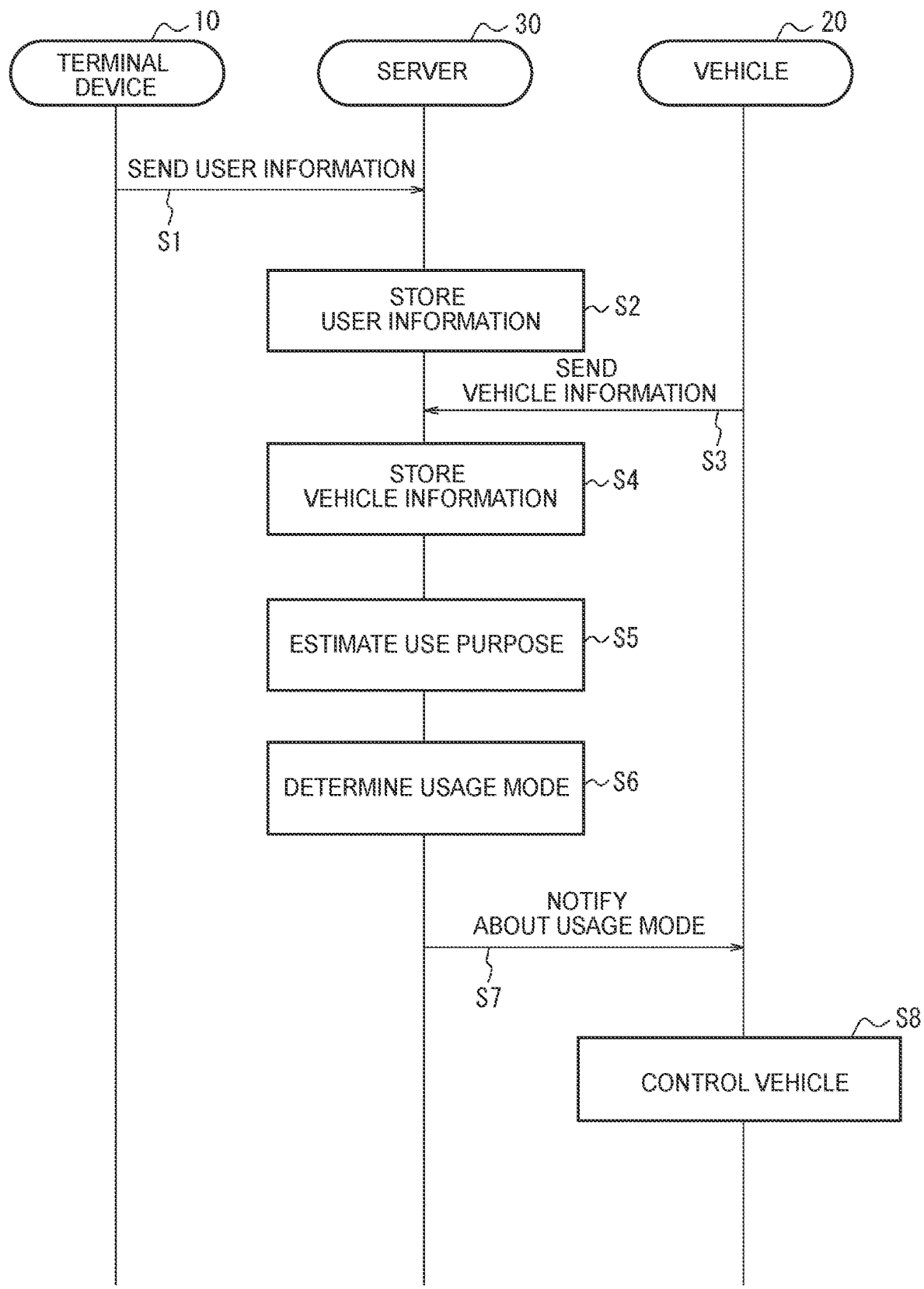
FIG. 2 is a sequence diagram showing the operation of the information processing system according to one embodiment of the present disclosure.

Next, with reference to the sequence diagram in FIG. 2, the operation of the information processing system 1 will be described.

Step S1: The terminal device 10 sends the user information 33 to the server 30 via the communication unit 11.

Step S2: The server 30 stores the user information, acquired from the terminal device 10, in the server storage unit 32.

Step S3: The vehicle 20 sends the vehicle information 34 to the server 30 via the communication device 21.

Step S4: The server 30 stores the vehicle information 34, acquired from the vehicle 20, in the server storage unit 32.

Step S5: The server 30 estimates the use purpose of the vehicle 20 based on the user information 33. The server 30 may estimate the use purpose of the vehicle 20 based on the user information 33 as well as on the vehicle information 34.

Step S6: The server 30 determines the usage mode based on the estimated use purpose.

Step S7: The server 30 notifies the vehicle 20 about the usage mode via the server communication unit 31. In other words, the server 30 sends the information on the determined usage mode to the vehicle 20 via the server communication unit 31.

Step S8: The vehicle 20 carries out the vehicle control of the vehicle 20 based on the notified usage mode.

(Processing for Estimating Use Purpose)

Next, the processing for estimating the use purpose in step S5 will be described in detail in the following first to third embodiments.

(First Embodiment: Estimation Processing for Movement Sharing or Place Sharing)

Figure 3:
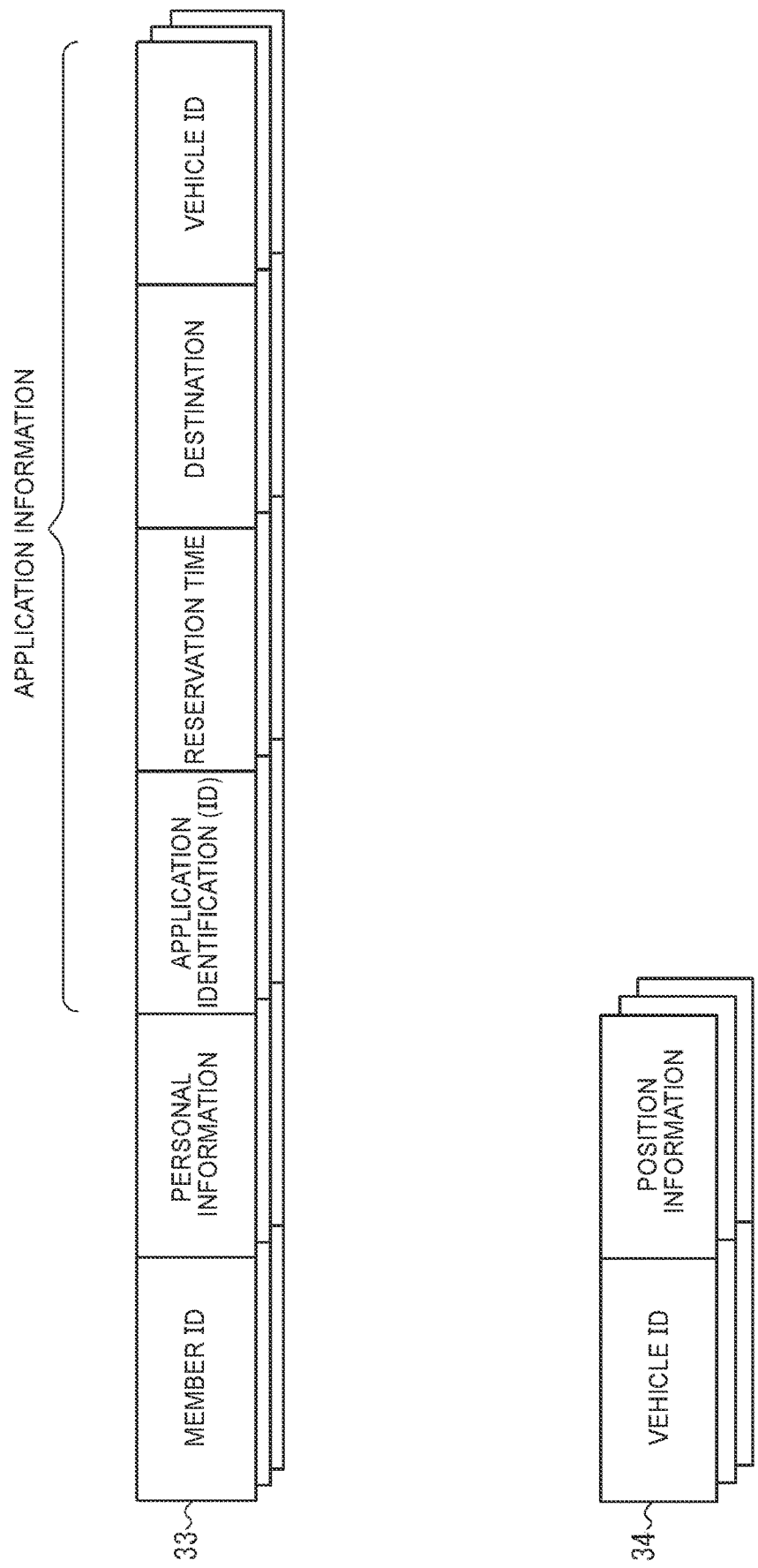
FIG. 3 is a conceptual diagram showing an example of user information and vehicle information used in the estimation processing in a first embodiment.

This embodiment describes the use purpose estimation processing that is performed when the user uses a car sharing application as another application to be executed in the terminal device 10. Roughly speaking, the user uses the vehicle 20 in this embodiment for moving from one place to another or uses the vehicle 20 for using the space in the vehicle. In other words, in this embodiment, the user uses the vehicle 20 for the purpose of movement sharing or place sharing. FIG. 3 shows an example of the user information 33 and an example of the vehicle information 34 that are used for the estimation processing in this embodiment. FIG. 4 shows a specific example of the user information 33. As shown in FIG. 3 and FIG. 4, the user information 33 includes the member ID, personal information, and application information. The application information includes the application identification (ID), reservation time, destination, and vehicle ID. The application identification (ID) is the identification information used to identify the car sharing application. The reservation time, destination, and vehicle ID are, respectively, the time reserved for using the vehicle 20, the destination, and the vehicle ID of the vehicle 20 to be used. As shown in FIG. 4, the personal information includes the information on the sex, age, address, and workplace. The vehicle information 34 is the information acquired from the vehicle 20. As shown in FIG. 3, the vehicle information 34 includes the vehicle ID and the position information.

In this embodiment, the server control unit 36 of the server 30 creates the estimation result database 35 by acquiring and aggregating the user information 33 and the vehicle information 34. The estimation result database 35 includes the estimation result of the use purpose estimated based on the user information 33 and the vehicle information 34. FIG. 5 shows an example of the estimation result database 35. For example, the estimation result database 35 includes the data on the day-of-week classification, use time, vehicle movement, member ID, personal information, destination, and estimation result. The day-of-week classification indicates the classification of each day of a week as either a weekday or a holiday. In FIG. 5, only the data on a weekday is shown. The use time indicates a predetermined time period of a day. In the example shown in FIG. 5, one day is divided into six time periods. The day-of-week classification and the use time correspond to the reservation time included in the user information 33. That is, the server control unit 36 classifies the user information 33 into respective time periods based on the reservation time included in the collected user information 33.

The data in the vehicle movement field indicates whether the vehicle 20 has moved in the time period. This data is determined based on the user information 33 and the vehicle information 34. More specifically, at the reservation time included in the user information 33, the server control unit 36 refers to the vehicle ID, included in the user information 33, to identify the reserved vehicle 20. The server control unit 36 also refers to the vehicle information 34 on the vehicle 20. If there is a change in the position information included in the vehicle information 34, the server control unit 36 determines that the vehicle movement is "Yes". On the other hand, if there is no change in the position information included in the vehicle information 34, the server control unit 36 determines that the vehicle movement is "No".

The member ID and the personal information included in the estimation result database 35 are based on the user information 33. Although FIG. 5 shows an example in which only the workplace is included in the estimation result database 35 as the personal information, the other personal information such as the sex, age, address, etc. may be included. The data in the destination field is based on the user information 33. If the information on the destination is included in the user information 33, the data on the destination is determined based on the information included in the user information 33 (e.g., "∘∘ Co., Ltd", "XX Co., Ltd", or "home", etc.). On the other hand, if the information on the destination is not included in the user information 33, the information on the destination is determined to be "None" as shown in FIG. 5. Note that, when the information on the destination is not included in the user information 33, the data in the destination field may be determined based on the vehicle information 34. For example, when the data in the vehicle movement field is "Yes", the position information before and after the vehicle power is turned off (IG-OFF or READY-OFF) is accumulated and, based on the accumulated position information, the position where the vehicle power is turned off frequently may be determined as the destination. In this way, the server control unit 36 may determine the data on the position to which the vehicle 20 moves, that is, the data in the destination field, based on the vehicle movement data and the position information.

The data in the estimation result field in the estimation result database 35 is the information on the use purpose of the vehicle 20 estimated by the server control unit 36 based on the user information 33 and the vehicle information 34. The server control unit 36 estimates the use purpose in each time period based on at least one of the day-of-week classification, use time, vehicle movement, member ID, personal information, and destination. That is, user's the use purpose of the vehicle 20 in a time period of each day-of-week classification may be estimated using the estimation result database 35. In other words, the server control unit 36 can accumulate the user information 33 in the past to learn about the user's behavior pattern and, based on this behavior pattern, estimate the user's use purpose at a certain time.

For example, in the use time from 0:00 to 5:59 on a weekday, the data in the vehicle movement field is "No" and the data in destination field is "None". Therefore, considering the data in the day-of-week classification field, use time field, vehicle movement field, and destination field, the server control unit 36 estimates that the use purpose is "to sleep". In the use time from 6:00 to 9:59 on the weekday, the data in the vehicle movement field is "Yes" and the data in the destination field is "∘∘ Co., Ltd". In addition, the data in the workplace field also is "∘∘ Co., Ltd". Therefore, considering the data in the day-of-week classification field, use time field, vehicle movement field, workplace field, and destination field, the server control unit 36 estimates that the use purpose is "to go to work". In the use time from 10:00 to 11:59 on the weekday, the data in the vehicle movement field is "Yes" and the data in the destination field is "xx Co., Ltd". On the other hand, the data in the workplace field is "∘∘ Co., Ltd". Therefore, considering the data in the day-of-week classification field, use time field, vehicle movement field, workplace field, and destination field, the server control unit 36 estimates that the use purpose is "to make a business trip".

In the use time from 12:00 to 12:59 on the weekday, the data in the vehicle movement field is "No" and the data in the destination field is "None". Therefore, considering the data in the day-of-week classification field, use time field, vehicle movement field, and destination field, the server control unit 36 estimates that the use purpose is "to have lunch or a nap". In the use time from 13:00 to 16:59 on the weekday, the data in the vehicle movement field is "No" and the data in the destination field is "None". Therefore, considering the data in the day-of-week classification field, use time field, vehicle movement field, and destination field, the server control unit 36 estimates that the use purpose is "to use as an office". In the use time from 17:00 to 23:59, the data in the vehicle movement field is "Yes" and the data in the destination field is "Home". Therefore, considering the data in the day-of-week classification field, use time field, vehicle movement field, and destination field, the server control unit 36 estimates that the use purpose is "to return home".

(Second Embodiment: Estimation Processing for Article Sharing)

This embodiment describes the use purpose estimation processing that is performed when the user uses an article sharing application, which allows clothing and a bag to be shared, as the application to be executed in the terminal device 10. Roughly speaking, the user uses the vehicle 20 in this embodiment for sharing an article. In one example shown below, it is assumed that a user (client user) uses an application to order an article and another user (acting user) uses a car sharing application to deliver the article. That is, in this embodiment, the use purpose of the vehicle 20 for an acting user is estimated.

FIG. 6 shows an example of user information 33*b* and vehicle information 34*b* used in the estimation processing in this embodiment. The user information 33*b* in this embodiment includes user information 331*b* on a client user and user information 332*b* on an acting user. The user information 331*b* includes a member ID, personal information, and application information. The application information includes an application identification (ID), an acting user ID, article information, and a delivery time. The application identification (ID) is the identification information for identifying an article sharing application. For example, as the article sharing application, there are an application for sharing clothing (clothing application) and an application for sharing a bag (bag application), each of which has its own identification information. Identification information is also assigned to an application other than an application for sharing an article (non-article sharing application). "Non-article sharing applications" include a car sharing application and a resource sharing application. The acting user ID is the information for identifying an acting user, i.e., the member ID of the acting user. The article information is the information on an article to be shared. The delivery time is the information on the delivery time of the article.

The user information 332*b* includes a member ID, personal information, and application information. The application information includes an application identification (ID), a reservation time, a destination, and a vehicle ID. The application identification (ID) is the identification information that identifies the car sharing application. The reservation time, destination, and vehicle ID are, respectively, the time scheduled for using the vehicle 20, the destination, and the vehicle ID of the vehicle 20 to be used. The personal information includes, for example, the information on the sex, age, address, and workplace.

As shown in FIG. 6, the vehicle information 34*b* includes a vehicle ID, position information, and sensor information. It is assumed in this embodiment that the sensor information is the image information on the driver's seat captured by the vehicle-mounted camera.

In this embodiment, the server control unit 36 of the server 30 creates the estimation result database 35 by acquiring and aggregating the user information 33*b* and the vehicle information 34*b*. The estimation result database 35 includes the estimation result of the use purpose estimated based on the user information 33*b* and the vehicle information 34*b*. FIG. 7 shows an example of the estimation result database 35. For example, the estimation result database 35 includes the data on the day-of-week classification, use time, application type, driver presence/absence, member ID, and estimation result. The day-of-week classification and the use time correspond to the delivery time, included in the user information 331*b*, and the reservation time included in the user information 332*b*. That is, the server control unit 36 classifies the user information 33*b* into respective time periods based on the delivery time and the reservation time included in the collected user information 33*b*.

The application type is determined based on the application identification (ID) included in the collected user information 331*b*. In FIG. 7, the application type is classified into one of the "clothing application", "bag application", and "non-article sharing application" based on application identification (ID). The data in the driver presence/absence field is determined based on the user information 331*b*, user information 332*b*, and vehicle information 34*b*. More specifically, the server control unit 36 refers to the user information 332*b* on the corresponding acting user based on the acting user ID included in the user information 331*b*. The server control unit 36 refers to the vehicle ID included in the user information 332*b* to identify the reserved vehicle 20. The server control unit 36 refers to the vehicle information 34*b* on the identified vehicle 20. The server control unit 36 determines whether the driver is present or absent based on the sensor information included in the vehicle information 34*b*, that is, in this example, based on the image information on the driver's seat. If it is determined that a driver is present based on the image information, the server control unit 36 determines that the driver presence/absence is "present". On the other hand, if it is determined that a driver is absent based on the image information, the server control unit 36 determines that the driver presence/absence is "absent". The member ID in FIG. 7 includes the member ID of the client user and member ID of the acting user ID (acting user ID), which are based on the user information 331*b*.

The data in the estimation result field is the information on the use purpose of the vehicle 20 estimated by the server control unit 36 based on the user information 33*b* and the vehicle information 34*b*. The server control unit 36 estimates the use purpose in each time period based on at least one of the day-of-week classification, use time, application type, driver presence/absence, and the member ID. That is, the user's use purpose of the vehicle 20 in a time period of each day-of-week classification can be estimated using the estimation result database 35. In other words, the server control unit 36 can accumulate the user information 33*b* and the vehicle information 34*b* in the past to learn about the user's behavior pattern and, based on this behavior pattern, estimate the user's use purpose at a certain time.

For example, in the use time from 10:00 to 11:59 on a weekday, the data in the application type field is "clothing application" and the data in the driver presence/absence field is "present". Therefore, in this case, considering the data in the application type field and the data in the driver presence/absence field, the server control unit 36 estimates that the use purpose is "to send clothing/bag". In the use time from 12:00 to 12:59 on the week day, the data in the application type field is "bag application" and the data in the driver presence/absence field is "present". Therefore, considering the data in the application type field and the data in the driver presence/absence field, the server control unit 36 estimates that the use purpose is "to send clothing/bag". In addition, in the use time from 13:00 to 16:59 on the weekday, the data in the application type field is "clothing application" and the data in the driver presence/absence field is "absent". Therefore, considering the data in the application type field and the data in the driver presence/absence field, the server control unit 36 estimates that the use purpose is "to send clothing/bag using an autonomous driving vehicle". That is, the use purpose is to send clothing or a bag by the vehicle 20 that drives autonomously. In the use times from 0:00 to 5:59, from 6:00 to 9:59, and from 17:00 to 23:59 on the weekday, the data in the application type field is "non-article sharing application". Therefore, considering the data in the application type field, the server control unit 36 estimates that the use purpose is "to share a non-article".

In this embodiment, the server control unit 36 estimates for sending clothing or a bag that the use purpose is "to send clothing/bag". It is also possible to estimate them separately and, in this case, the estimation result may be that the use purpose is "to send clothing" or "to send a bag". In addition, for the other estimation results, the server control unit 36 estimates that the use purpose is "to share a non-article" but the use purpose is not limited thereto. For example, the server control unit 36 may estimate that the use purpose is to share movement, to share a place or to share a resource.

In this embodiment, the server control unit 36 estimates the use purpose when sending clothing or a bag. This embodiment can also be used to estimate the use purpose in the same way when sending any other articles. For example, when sending a raw thing, a document, or furniture, the server control unit 36 can estimate the use purpose in the same way as described above. In addition, the vehicle movement data may be included in the estimation result database 35 as in the first embodiment. The vehicle movement data makes it possible to confirm that the vehicle 20 has moved (for example, the vehicle has been used for delivery, etc.), improving the estimation accuracy. The vehicle movement data can be determined by the position information included in the vehicle information 34b as in the first embodiment.

(Third Embodiment: Estimation Processing for Resource Sharing)

This embodiment describes the use purpose estimation processing that is performed when the user uses a resource sharing application as another application to be executed in the terminal device 10. The resource sharing application may be an application except the car sharing application. Roughly speaking, the user uses the vehicle 20 in this embodiment for sharing a resource. In one example given below, it is assumed that one user uses an application that requests resource sharing (e.g., a childcare application, etc.) and another user uses a car sharing application to provide the requested resource. That is, in this embodiment, the use purpose of the vehicle 20 is estimated for the acting user.

FIG. 8 shows an example of user information 33c used in the estimation processing in this embodiment. The user information 33c in this embodiment includes user information 331c on a client user and user information 332c on an acting user. The user information 331c includes a member ID, personal information, and application information. The application information includes an application identification (ID), an acting user ID, request information, and request time. The application identification (ID) is the identification information for identifying a resource sharing application. The content of a shared resource is, for example, childcare, skill, pet-care, participation in cross cultural exchange services, and participation in a dinner party. The skill is, for example, housekeeping. In this embodiment, it is assumed that the skill is housekeeping. Participation in a dinner party may involve cooking for the dinner party, in which case at least one of the client user and the acting user will cook. Identification information is provided for each of these resource sharing applications. Identification information is also provided for an application that is not an application for sharing resources (non-resource sharing application). The acting user ID is the information for identifying an acting user, that is, the member ID of the acting user. The request information is the information on a resource to be shared, for example, the specific contents of the request. The request time is the information on the time at which the resource will be provided.

The user information 332c includes a member ID, personal information, an application identification (ID), a reservation time, a destination, and a vehicle ID. The application identification (ID) is the identification information that identifies the car sharing application. The reservation time, destination, and vehicle ID are, respectively, the time scheduled for using the vehicle 20, destination, and the vehicle ID of the vehicle 20 to be used. The personal information includes, for example, the sex, age, address, and workplace.

In this embodiment, the server control unit 36 of the server 30 creates the estimation result database 35 in which the user information 33c is acquired and aggregated. The estimation result database 35 includes the estimation result of the use purpose estimated based on the user information 33c. FIG. 9 shows an example of the estimation result database 35. For example, the estimation result database 35 includes the data on the day-of-week classification, use time, application type, member ID, and estimation result. The day-of-week classification and the use time correspond to the request time included in the user information 331c and the reservation time included in the user information 332c. That is, the server control unit 36 classifies the user information 33c into respective time periods based on the request time and the reservation time included in the collected user information 33c. The estimation result database 35 shown in FIG. 9 shows data on a weekday as well as on a holiday.

The data in the application type field is determined based on the application identification (ID) included in the collected user information 331c. In the estimation result database 35 shown in FIG. 9, application types are classified into one of childcare, skill, pet-care, cross cultural exchange, and dinner party based on the application identification (ID). These application types correspond to the above-mentioned examples of resources, namely, childcare, skill, pet-care, participation in cross cultural exchange services, and participation in a dinner party, respectively. For each use time, the application type field corresponding to the application type used in that use time contains a circle. For a use time where any field does not contain a circle, a non-resource sharing application is used. The data in the member ID field in the estimation result database 35 includes the member ID of a client user and the member ID of an acting user (acting user ID), which are based on the user information 331c.

The data in the estimation result field is the information on the use purpose of the vehicle 20 estimated by the server control unit 36 based on the user information 33c. The server control unit 36 estimates the use purpose in each time period based on at least one of the day-of-week classification, use time, application type, and member ID. That is, the user's use purpose of the vehicle 20 in a time period of each day-of-week classification may be estimated using the estimation result database 35. In other words, the server control unit 36 can accumulate the user information 33c in the past to learn about the user's behavior pattern and, based on this behavior pattern, estimate the user's use purpose at a certain time.

For example, in the use time from 10:00 to 11:59 on a weekday, the data in the application type field is "skill". Therefore, considering the data in the application type field, the server control unit 36 estimates that the use purpose is "to do housekeeping". In the use time from 17:00 to 23:59 on the weekday, the data in the application type field is "dinner party". Therefore, considering the data in the application type field, the server control unit 36 estimates that the use purpose is "to have dinner with friends". In the use time from 10:00 to 11:59 on a holiday, the data in the application type field is "pet-care". Therefore, considering the data in the application type field, the server control unit 36 estimates that the use purpose is "to take care of pets". In the use time from 12:00 to 12:59 on the holiday, the data in application type field is "childcare". Therefore, considering the data in the application type field, the server control unit 36 estimates that the use purpose is "to take care of a child". In the use time from 17:00 to 23:59 on the holiday, the data in application type field is "cross-cultural exchange". Therefore, considering the data in the application type field, the server control unit 36 estimates that the use purpose is "to participate in cross cultural exchange services".

When a non-resource sharing application is used in this embodiment, the server control unit 36 estimates that the use purpose is to "share a non-resource" but is not limited thereto. For example, the server control unit 36 may estimate that the use purpose is to share movement, to share a place, or to share an article.

(Usage mode determination and vehicle control in each embodiment) Next, usage mode determination processing and vehicle control processing in steps S6 to S8 shown in FIG. 2 will be described in detail below. The server control unit 36 determines the usage mode of the vehicle 20 according to the use purpose estimated in step S5 and notifies the vehicle 20 about the determined usage mode to control the vehicle 20.

FIG. 10 shows an example of the relationship between estimation results and usage modes. The estimation results in FIG. 10 correspond to the estimation results estimated in the first embodiment described above. For example, when the estimation result is "sleep" "go to work" or "return home", the server control unit 36 determines the usage mode as "extremely comfortable mode", "energy saving mode", or "comfortable mode" respectively and notifies the vehicle 20 about the determined usage mode. The vehicle 20 controls the vehicle based on the notified usage mode.

When the "extremely comfortable mode" notification is received, the control device 22 of the vehicle 20 controls air conditioning with highest priority on comfortableness. This mode allows the user to spend very comfortably in the vehicle interior. On the other hand, when the "energy saving mode" notification is received, the control device 22 controls air conditioning considering both comfortableness and vehicle fuel consumption, with the priority of vehicle fuel consumption over the priority of comfortableness. For example, the control device 22 may control air conditioning using the same setting values that are used for the air conditioning environment in the user's workplace (office), thus providing the vehicle interior environment suitable for business use. The server 30 may acquire the information on the air conditioning environment of the office from the air conditioner in the user's office. When acquiring the information from the air conditioner in the office, the server 30 may acquire, via the network 40, the information on the temperature, humidity, and air volume that are set in the air conditioner in the office. In this case, the air conditioner in the office may be connected to the network 40 via the Energy Management System (EMS). The server 30 may also acquire this information from the terminal device 10 of the user. The setting values used in the energy saving mode may also be predetermined values. For example, the predetermined values may be an indoor temperature of 28° C. and a humidity of 50 to 60%.

When the "comfortable mode" notification is received, the control device 22 controls air conditioning considering both comfortableness and vehicle fuel consumption with the priority of comfortableness over the priority of vehicle fuel consumption. For example, the control device 22 controls air conditioning using the same setting values that are used for the air conditioning environment at the user's home. This allows the user to spend comfortably in the vehicle interior. The server 30 may acquire the information on the air conditioning environment at home from the air conditioner at the user's home. When acquiring the information from the air conditioner at home, the server 30 may acquire, via the network 40, the information on the temperature, humidity, and air volume that are set in the air conditioner at home. In this case, the air conditioner at home may be connected to the network 40 via the EMS. The server 30 may also acquire this information from the terminal device 10 of the user. The setting values used in the comfortable mode may also be predetermined values. For example, the predetermined values may be an indoor temperature of 27° C. and a humidity of 60 to 65%.

FIG. 11 shows another example of the relationship between estimation results and usage modes. The estimation results in FIG. 11 correspond to the estimation results estimated in the second embodiment described above. For example, when the estimation result is "send clothing/bag" or "send clothing/bag+drive autonomously", the server control unit 36 determines the usage mode of both estimation results as "storage mode" and notifies the vehicle 20 about the determined usage mode. When the estimation result is "send raw thing", "send document", or "send furniture", the server control unit 36 determines the usage mode as "extremely comfortable mode", "storage mode" or "extreme energy saving mode" respectively and notifies the vehicle 20 about the determined usage mode. The vehicle 20 controls the vehicle based on the notified usage mode.

When the "storage mode" notification is received, the control device 22 of the vehicle 20 controls air conditioning considering the storage of an article and the comfortableness of the driver. For example, in this usage mode, the humidity is set to 40% to 50% to protect the material that may be adversely influenced by high humidity. When the "extreme energy saving mode" notification is received, the control device 22 controls air conditioning with highest priority on vehicle fuel consumption. For example, to minimize the electric load, the control device 22 turns off the compressor, blower, etc.

FIG. 12 shows still another example of the relationship between estimation results and usage modes. The estimation results in FIG. 12 correspond to the estimation results estimated in the third embodiment described above. When the estimation result is "do housekeeping", "have dinner with friends", "take care of pets", "take care of child", or "participate in cross cultural exchange services", the server control unit 36 determines the corresponding usage mode and notifies the vehicle 20. More specifically, for these estimation results, the server control unit 36 determines the usage mode as "housekeeping mode", "dinner-with-friends mode", "pet-care taking mode", "childcare taking mode", or "cross-cultural exchange mode", and notifies the vehicle 20. The vehicle 20 controls the vehicle based on the notified usage mode. Roughly speaking, these usage modes are mainly used to control information provision in the vehicle 20. In order to provide information, the server 30 may send necessary information to the vehicle 20. For example, the server 30 may send the user information 33c to the vehicle 20, or may send the information itself, which is to be provided to the user, to the vehicle 20.

When the "housekeeping mode" notification is received, the control device 22 of the vehicle 20 provides the information useful for housekeeping. The information to be provided is determined based on the request information and the request time included in the user information 33c. The request information includes a requested job and the information on allergy. The client-requested job includes, for example, cooking, cleaning (garbage disposal, etc.), and the like. For example, when the requested job is cooking, the control device 22 may provide the map information and the store information (information on the supermarket) around the client user's home and corresponding to the requested time to assist the user (acting user) who is not families with the area. Furthermore, the control device 22 may provide, in advance, the information on allergy-related foods and dishes based on the information on allergy to assist the user in not providing allergic ingredients. Also, when the requested job is cleaning, the control device 22 may check the information on the rules, established by the local government closest to the client's address, and provide the information prescribed by the rules to assist the user according to the request time. Such information may be, for example, the information on the separate collection of garbage (burnable garbage, plastic garbage, metal garbage, or the like).

When the "dinner-with-friends mode" notification is received, the control device 22 provides the information that can be useful for a dinner party. The information to be provided is determined based on the request information and the request time included in the user information 33c. The request information includes the information on the party's place and a dish menu and the profile information on participants. For example, when it is necessary to purchase ingredients according to the dish menu, the control device 22 may provide the map information and the store information around the party's place to assist the user (acting user) who is not familiar with the area.

The "pet-care taking mode" is a usage mode in which a pet is assumed in the vehicle 20. When this usage mode notification is received, the control device 22 controls traveling and information-provision while ensuring comfortableness and safety, considering that a pet is in the vehicle 20. To ensure comfortableness, the control device 22 controls air conditioning in the way similar to that in the "extremely comfortable mode" described above. To ensure safety, the control device 22 may reduce the impact of sudden start, sudden braking, and sudden steering during driving to ease the motion sickness of the pet. To prevent sudden start, the control device 22 may limit the accelerator opening amount to reduce the acceleration to an acceptable level when the accelerator depression torque is equal to or larger than the threshold value. In addition, to reduce the number of times sudden braking is applied, the control device 22 may provide the information on the occurrence of congestion on the traveling route. When the inter-vehicle distance required for the vehicle speed is not maintained, the control device 22 may output a warning. Furthermore, to prevent traveling around a sharp curve at a high speed, the control device 22 may control the traveling in such a way that the vehicle speed is reduced before a curve on the traveling route (for example, 100 m before the curve) to reduce the centrifugal force on the vehicle 20.

When "childcare taking mode" notification is received, the control device 22 provides the information that can be useful for childcare taking. The information to be provided is determined based on the request information and the request time included in the user information 33c. The request information includes the information on a requested job, child's allergy, pickup/drop-off location, and child's interests. The requested job includes, for example, cooking, taking a child to and from the pickup/drop-off location, and childcare. For example, when the requested job is cooking, the control device 22 may provide the map information and the store information (information on the supermarket) around the client user's home according to the requested time to assist the user (acting user) who is not familiar with the area. Furthermore, the control device 22 may provide, in advance, the information on allergy-related foods and dishes based on the information on the child's allergy to assist the user in not providing allergic ingredients. Furthermore, when the requested job is to take a child to and from the pickup/drop-off location, the control device 22 may provide the information on the pickup/drop-off location according to the requested time to assist the user (acting user) who is not familiar with the area. Furthermore, when the requested job is childcare taking, the control device 22 may provide the information on child's interests to assist the user (acting user). The information on the interests includes, for example, the information on music or video. When the streaming service is contracted, the control device 22 may automatically reproduce the child's favorite music or video. Such music or video attracts child's interests to make childcare taking easy.

When the "cross cultural exchange mode" notification is received, the control device 22 provides the information that can be useful for cross cultural exchanges. The information to be provided is determined based on the request information and the request time included in the user information 33c. The request information includes the information on the party's place and a dish menu and the profile information on participants. For example, when it is necessary to purchase ingredients required for the dish menu, the control device 22 may provide the map information and store information around the party's place to assist the user (acting user) who is not familiar with the area. The profile information may include the nationality information and may provide the previous knowledge, such as the manner and culture of the participant's country, that is useful before meeting the participants.

As described above, according to the information processing system 1 in the embodiments, the server 30 receives the user information from the terminal device 10 and estimates the use purpose based on the received user information. Then, according to the estimated use purpose, the server 30 determines the usage mode of the vehicle 20 and controls the vehicle 20 based on the determined usage mode. Therefore, the information processing system 1 controls the vehicle 20 to suit the use purpose of the user, thus improving convenience. The vehicle control is at least one of air conditioning control, information provision control, and traveling control. This vehicle control enhances the interior environment, fuel economy, comfortableness, and convenience of the vehicle 20.

The user information includes the application information on an application that is executed on the terminal device. This application information increases the accuracy of estimating the use purpose of the user. The applications executed on the terminal device include at least one of a car sharing application, an article sharing application, and a resource sharing application. Since these applications may use the vehicle 20 for various purposes, using the application information on these applications makes it possible to estimate the use purpose more accurately. In estimating the use purpose, the vehicle information may also be used. Estimating the use purpose based on the user information as well as on the vehicle information further improves the estimation accuracy.

Although the present disclosure has been described with reference to the drawings and embodiments, it should be noted that those skilled in the art can easily make various changes and modifications based on the present disclosure. Therefore, it is to be noted that these changes and modifications are within the scope of the present disclosure. For example, it is possible to relocate the functions included in each unit or each step in such a way that they are not logically contradictory, to combine a plurality of units or steps into one, or to divide each of a plurality of units or steps.

Although the estimation results of use purposes and their usage modes shown in FIG. 10 to FIG. 12 are used in the embodiments described above, the server control unit 36 may be used for estimating any other use purposes. Then, according to an estimation result, the server control unit 36 may determine any usage mode. Although the vehicle control is one of air conditioning control, traveling control, and information provision control in the above example, the present disclosure is not limited thereto. The vehicle control may be a combination of them or any other control related to the vehicle may be carried out. Note that the content of vehicle control based on each usage mode described above is merely an example and that the vehicle 20 may control the vehicle in any way in each usage mode.

For example, in the "extremely comfortable mode" "comfortable mode" and "energy saving mode" in the embodiments described above, the control device 22 of the vehicle 20 may control air conditioning to prevent heatstroke. For example, the control device 22 may control air conditioning based on the outside air temperature, the vehicle interior temperature, the amount of scattered solar radiation, the open/close state of the window of the vehicle 20, the heat index, and the outside air temperature and the heat index of the vehicles around the vehicle 20. The heat index (WBGT: Wet Bulb Globe Temperature), which is an indicator of heat determined based on humidity, radiation heat elements, and temperature, can be used as an index for determining the possibility of occurrence of heatstroke. The control device 22 may further control air conditioning based on the time information. For example, the control device 22 may control air conditioning so that the air volume is smaller when it is nighttime than when it is daytime, or may control air conditioning according to the season. The control device 22 may also control window opening and closing.

In addition, when there is a passenger other than the user in the vehicle 20, the usage mode may be determined, and the vehicle may be controlled, in consideration of the characteristics of the passenger. The characteristics of the passenger include the relationship with the user. For example, when the passenger is a friend, a family member, or a business associate, the usage mode may vary according to the passenger. To estimate whether a passenger other than the user is in the vehicle 20 and to estimate what are the characteristics of the passenger, the user information or the vehicle information is used as necessary. For example, the user information may include the information on the user's household, the presence or absence of an infant, the occupation, or the year in which the user joined the company. The user information may also include the association information and the address book information. These pieces of information may be acquired under the user's consent from the terminal device 10 or any service (e.g. social networking service etc.) used by the user.

In the embodiments described above, the control device 22 of the vehicle 20 controls the vehicle according to the usage mode notification received from the server 30. Instead of controlling the vehicle in this way, the control device 22 may change the usage mode according to the situation and, based on the changed usage mode, control the vehicle. For example, when the amount of solar radiation into the vehicle interior increases and the need for preventing a heat stroke increases, the control device 22 may change the usage mode from the "energy saving mode" or the "comfortable mode", which has been notified from the server 30, to the "extremely comfortable mode".

The embodiments described above show an example in which the vehicle information includes the position information and the sensor information and, in addition, the sensor information is the image information on the driver's seat. The information included in the vehicle information is not limited thereto but any information on the vehicle 20 may also be included. For example, the vehicle information may include the video information on the interior of the vehicle 20. In this case, the server control unit 36 may use this video information to identify the information on an article to be delivered. The server control unit 36 may also use this video information to determine whether a pet is in the vehicle when the requested job, included in the request information, is to take care of a pet. The vehicle information may also include the operation state information on the vehicle 20 (for example, the autonomous driving state). In this case, the server control unit 36 may estimate the operation state of the vehicle 20 based on this operation state information. The operation state information and the image information on the driver's seat may also be combined to identify the operation state more accurately. The vehicle information may also include data on the seat belt wearing state of the driver seated in in the driver's seat and data on the seating state detected by the seat sensor. In this case, the server control unit 36 can estimate the driver presence/absence data based on this data. The driver presence/absence data may be estimated more accurately by using both this data and the position information data.

In the first embodiment and the second embodiment described above, the server control unit 36 performs the estimation processing using the user information 33 and the vehicle information 34. In these embodiments, the server control unit 36 may also perform the estimation processing using only the user information 33.

When one user uses a plurality of different applications in the same time period in the embodiments described above, the priority of the applications may be set in order to determine which application's user information is to be used for estimating the use purpose. For example, priority may be set in descending order of the car sharing application, the article sharing application, and the resource sharing application. By setting priority in this order, the user information including the information on a higher-priority application is used preferentially when a user uses a plurality of applications in the same time period. Note that an application that has low priority but includes useful information may be handled exceptionally. For example, when the user information including article information and a delivery time is available for an article sharing application, this user information may be used regardless of priority to estimate the use purpose. Similarly, when the user information including request information and a request time is available for a resource sharing application, this user information may be used regardless of priority to estimate the use purpose.

In the embodiments described above, the server control unit 36 determines the vehicle 20 to be controlled, based on the vehicle ID included in the user information 33. The server control unit 36 may also determine the vehicle 20 to be controlled, based on the position information on the terminal device 10 and the position information on the vehicle 20. For example, the server control unit 36 may determine whether there is the terminal device 10 within a predetermined range of the vehicle 20, based on the position information acquired from the terminal device 10 and on the position information acquired from the vehicle 20. If it is determined that the terminal device 10 and the vehicle 20 are within the predetermined range, the server control unit 36 notifies the vehicle 20 about the usage mode to allow the vehicle 20 to control the vehicle. Doing so allows the vehicle 20 to be controlled more reliably, for example, when the vehicle 20 to be used by the user cannot be identified.

The server control unit 36 estimates the use purpose of the vehicle 20 based on user information in the examples shown in the above embodiments, but the present disclosure is not limited thereto. For example, the user information may include the information on the use purpose. In this case, the server control unit 36 does not perform the use purpose estimation processing but determines the usage mode of the vehicle 20 based on the use purpose included in the user information.

It is also possible to configure a general-purpose electronic device, such as a mobile phone, a smartphone, a tablet terminal, or a mobile computer, as an electronic device that functions as the terminal device 10, the control device 22, or the server 30 that are used in the embodiments described above. More specifically, a program describing the processing for implementing the function of the terminal device 10, the control device 22, or the server 30 according to the embodiments is stored in the memory of the electronic device and, from this memory, this program is read by the processor of the electronic device for execution. Therefore, the disclosure according to the embodiments can also be implemented as a program executable by the processor.

The network 40 used in the embodiments includes not only the example described above but also an ad hoc network, a Local Area Network (LAN), a Metropolitan Area Network (MAN), a cellular network, a Wireless Personal Area Network (WPAN), a Public Switched Telephone Network (PSTN), a terrestrial wireless network, an optical network, and any other network or any combination these networks. The components of a wireless network include, for example, access points (e.g., Wi-Fi access points), femtocells, and the like. In addition, a wireless communication device may be connected to a wireless network that uses Wi-Fi (registered trademark) technology, Bluetooth technology (registered trademark), cellular communication technology, or any other wireless technology or technical standard.

What is claimed is:

1. An information processing device comprising:
   a communicator configured to communicate with a vehicle used by a user and a terminal device of the user; and
   a processor programmed to:
   receive user information on the user from the terminal device via the communicator;
   determine an operating mode of the vehicle according to a use purpose of the vehicle, the use purpose being determined based on the user information; and
   send operating mode information on the operating mode to the vehicle via the communicator.

2. The information processing device according to claim 1, wherein
   the user information includes application information on an application operated on the terminal device, and
   the processor is programmed to estimate the use purpose based on the application information.

3. The information processing device according to claim 1, wherein the processor is programmed to
   receive vehicle information on the vehicle via the communicator, and
   estimate the use purpose based on the user information and the vehicle information.

4. The information processing device according to claim 3, wherein
   the vehicle information includes at least one of position information on the vehicle, video information on an interior of the vehicle, sensor information on the vehicle, and operation state information of the vehicle.

5. The information processing device according to claim 1, wherein
   the information processing device is configured to perform vehicle control of the vehicle based on the operating mode, and
   the vehicle control includes at least one of air conditioning control in the vehicle, information provision control in the vehicle, and traveling control in the vehicle.

6. The information processing device according to claim 1, wherein
   the processor is programmed to send information on the operating mode to the vehicle via the communicator when the processor determines, based on position information on the terminal device and the position information on the vehicle, that there is the terminal device within a predetermined range from the vehicle.

7. The information processing device according to claim 2, wherein
   the processor is programmed to send information on the operating mode to the vehicle via the communicator when the processor determines, based on position information on the terminal device and the position information on the vehicle, that there is the terminal device within a predetermined range from the vehicle.

8. The information processing device according to claim 2, wherein
   the application information includes a description of the application.

9. The information processing device according to claim 2, wherein
   the application information includes information on a resource sharing application on the terminal device other than a car sharing application.

10. An information processing method comprising:
receiving user information on a user who uses a vehicle from a terminal device of the user;
determining an operating mode of the vehicle according to a use purpose of the vehicle, the use purpose being determined based on the user information; and
sending operating mode information on the operating mode to the vehicle.

11. A non-transitory recording medium storing a program causing an information processing device to execute:
receiving user information on a user who uses a vehicle from a terminal device of the user;
determining an operating mode of the vehicle according to a use purpose of the vehicle based on the user information; and
sending operating mode information on the operating mode to the vehicle.

\* \* \* \* \*